United States Patent
Yamanaka

(10) Patent No.: US 11,140,282 B2
(45) Date of Patent: Oct. 5, 2021

(54) CHARACTER LINE DIVISION APPARATUS AND METHOD, AND STORAGE MEDIUM

(71) Applicant: CANON KABUSHIKI KAISHA, Tokyo (JP)

(72) Inventor: Satoru Yamanaka, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/892,704

(22) Filed: Jun. 4, 2020

(65) Prior Publication Data

US 2020/0396346 A1   Dec. 17, 2020

(30) Foreign Application Priority Data

Jun. 13, 2019  (JP) .............................. JP2019-110205

(51) Int. Cl.
*H04N 1/00* (2006.01)
*G06K 9/34* (2006.01)

(52) U.S. Cl.
CPC ......... *H04N 1/00331* (2013.01); *G06K 9/344* (2013.01); *H04N 1/00737* (2013.01); *G06K 2209/01* (2013.01)

(58) Field of Classification Search
CPC ........... H04N 1/00331; H04N 1/00737; H04N 2209/01; G06K 9/344
See application file for complete search history.

(56) References Cited

U.S. PATENT DOCUMENTS 7,889,393 B2 * 2/2011 Yoshizawa ........... H04N 1/4097
358/3.01
2010/0104131 A1 * 4/2010 Yokoi .................... G06K 9/348
382/100

FOREIGN PATENT DOCUMENTS

JP        H06-223224         8/1994

* cited by examiner

*Primary Examiner* — Quang N Vo
(74) *Attorney, Agent, or Firm* — Venable LLP

(57) ABSTRACT

The character line division apparatus has character line contact determination unit configured to determine whether a character line of interest comes into contact with another character line in the height direction, count value derivation unit configured to derive a count value of the number of black pixels in the width direction in the character line of interest in the character line of interest determined to come into contact with another character line, and character line division unit configured to perform character line division for the character line of interest determined to come into contact with another character line on the periphery of a reference point derived from the character line information and the character height information by taking a first position at which the count value becomes a minimum in the height direction of the character line of interest as a character line division position.

20 Claims, 14 Drawing Sheets

My Shop

Kawasaki branch
TEL 0120-123-4567
November 6, 2018 (TUE)  No. 0003

| | |
|---|---|
| canned coffee | ¥120 |
| cup ramen | ¥220 |
| scourer | ¥210 |

---

Subtotal ¥550
(included consumption tax ¥40)
Total ¥550
Received amount ¥550
Change ¥0

My Shop

Kawasaki branch — 701
TEL 0120-123-4567
November 6, 2018 (TUE)    No. 0003

| canned coffee | ¥120 |
| cup ramen | ¥220 |
| scourer | ¥210 |

Subtotal ¥550 — 702
  (included consumption tax  ¥40)
  Total  ¥550
Received amount  ¥550
Change  ¥0

CHARACTER LINE DIVISION APPARATUS AND METHOD, AND STORAGE MEDIUM

BACKGROUND

Field

The present disclosure relates to a technique to divide character line images from a character area of a scanned image.

Description of the Related Art

Conventionally, there is a character recognition technique (OCR technique) to recognize a character within a scanned image obtained by optically reading a document with a camera, a scanner, or the like. With the OCR technique, it is necessary to accurately grasp the position and the size of each character by dividing the character area of a scanned image in units of character lines (hereinafter, referred to as line division), dividing the character area in units of characters and so on. In a case where characters within a scanned image come into contact with each other between character lines due to dust or the like at the time of reading of a document, it is no longer possible to perform the line division appropriately, and therefore, the OCR accuracy is reduced.

Japanese Patent Laid-Open No. 1994-223224 has described a technique to determine whether a character line is a contact character line whose character comes into contact with another character in the vertically adjacent line by acquiring a count value by binarizing an image and counting the number of black pixels in the width direction of the line and taking the average character height derived (obtained) from the acquired count value of the black pixels as a reference.

SUMMARY

Note that, for a business form in which the space between lines is very narrow and line contact in which lines come into contact with each other occurs at a plurality of portions, and there is a contact line whose character comes into contact with another character in the vertically adjacent line, there is a case where it is not possible to appropriately perform the line division in a scanned image even by using the technique of Japanese Patent Laid-Open No. 1994-223224. For example, by a receipt printer that saves roll paper used for printing, there is a case where a receipt is generated in which the space between character lines in a character area is very narrow and the line contact occurs at a plurality of portions.

In the technique of Japanese Patent Laid-Open No. 1994-223224, by taking the average character height derived from the count value of black pixels as a reference, whether a character line is a contact character line is determined and in a case where a plurality of contact character lines exists, the difference between the average character height including contact character lines and the actual line height becomes large. Due to this, there is a possibility that it is not possible to accurately determine whether a character line is a contact character line, and therefore, it is not possible to appropriately perform the character line division. Further, in a scanned image of a document in which the number of lines is small, in a case where there are contact character lines at several portions, the average character height largely deviates from the actual character height, and similarly, there is a possibility that it is not possible to accurately determine whether a line is a contact line, and therefore, it is not possible to appropriately perform the line division.

The present disclosure provides a technique to appropriately perform character line division for a scanned image obtained by optically reading a document.

The character line division apparatus according to one aspect of the present disclosure includes: an acquisition unit configured to acquire character line information indicating a size and a position of each character line within a binary image obtained by binarizing a scanned image obtained by optically reading a document, and character information indicating a size and a position of each character in a character line within the binary image; an extraction unit configured to extract character height information indicating a character height from the character information; a first determination unit configured to determine whether a character comes into contact with another character in a height direction based on the character height information; a second determination unit configured to determine whether a character line of interest among character lines in the document comes into contact with another character line in a height direction based on the character line information and determination results by the first determination unit; an obtaining unit configured to obtain a count value obtained by counting a number of black pixels in a width direction in a character line of interest in the character line of interest determined to come into contact with another character line by the second determination unit; and a character line division unit configured to perform character line division for the character line of interest determined to come into contact with another character line by the second determination unit on a periphery of a reference point obtained from a position of a character line indicated by the character line information and the character height information by taking a first position at which the count value becomes a minimum in a height direction of the character line of interest as a character line division position.

Further features of the present disclosure will become apparent from the following description of exemplary embodiments with reference to the attached drawings.

BRIEF DESCRIPTION OF THE DRAWINGS

FIG. 3 is a diagram showing a scanned image example;

FIG. 7 is a diagram showing a binary image example of a scanned image;

DESCRIPTION OF THE EMBODIMENTS

In the following, aspects for embodying the present disclosure are explained by using the drawings. Note that components described in embodiments are merely exemplary and not intended to limit the scope of the present disclosure to those. Further, all combinations of the components explained in the embodiments are not necessarily indispensable to the solution for solving the problem and there can be various modifications and alterations.

First Embodiment

Figure 1:
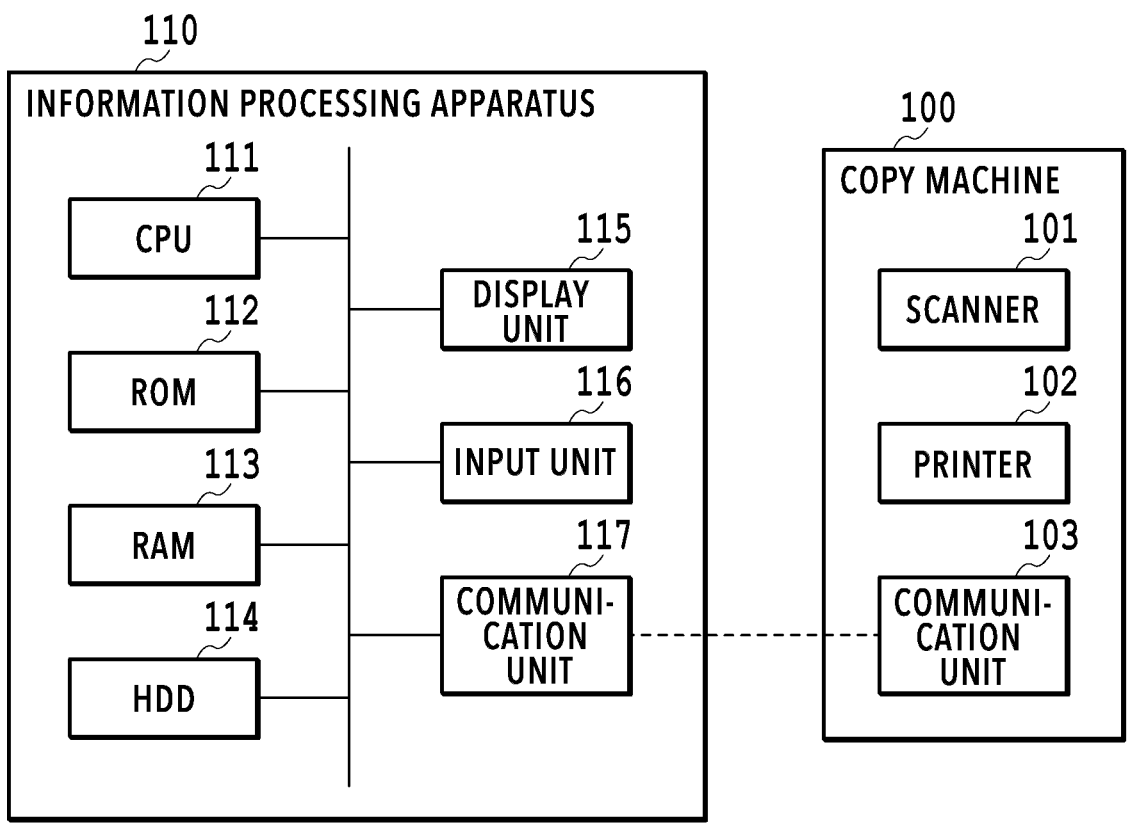
FIG. 1 is a diagram showing an overview of an information processing system.

FIG. 1 is a diagram showing an overview configuration example of an information processing system according to the present embodiment. The information processing system has a copy machine 100 and an information processing apparatus 110. The copy machine 100 has a scanner 101, a printer 102, and a copy machine-side communication unit 103. The scanner 101 generates a scanned image obtained by performing a scan to optically read a document. The printer 102 forms an image on a printing medium, such as paper. The copy machine-side communication unit 103 performs communication processing with an external device via a network. The copy machine-side communication unit 103 performs communication processing with, for example, a communication unit 117 of the information processing apparatus 110, to be described later.

The information processing apparatus 110 has a CPU 111, a ROM 112, a RAM 113, an HDD 114, a display unit 115, an input unit 116, and the information processing apparatus-side communication unit 117. The CPU 111 performs various kinds of processing by reading control programs stored in the ROM 112. The RAM 113 is used as a temporary storage area, such as a main memory and a work area, of the CPU 111. The HDD 114 stores various kinds of data, various programs and the like. The functions and processing of the information processing apparatus 110, to be described later, are implemented by the CPU 111 reading programs stored in the ROM 112 or the HDD 114 and executing the programs.

The information processing apparatus-side communication unit 117 performs communication processing with an external device via a network. The information processing apparatus-side communication unit 117 performs communication processing with, for example, the communication unit 103 of the copy machine 100. The display unit 115 displays various kinds of information. The input unit 116 has an input device, such as a keyboard and a mouse, and receives various operations by a user. The display unit 115 and the input unit 116 may be provided as one unit, such as a touch panel. Further, the display unit 115 may be one that performs projection by a projector and the input unit 116 may be one that recognizes the position of the finger tip for the projected image by a camera.

In the present embodiment, the scanner 101 of the copy machine 100 scans a document, such as a receipt, and generates an input image (scanned image 301). Then, the input image is transmitted to the information processing apparatus 110 by the copy machine-side communication unit 103. In the information processing apparatus 110, the information processing apparatus-side communication unit 117 receives the input image and stores the input image in the storage unit, such as the HDD 114.

Figure 2:
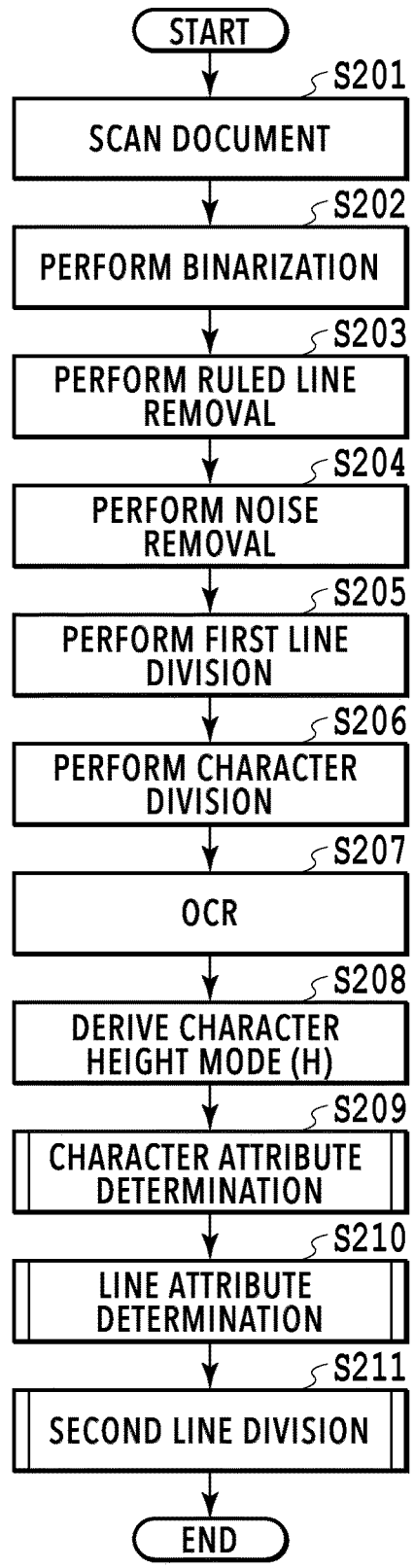
FIG. 2 is a flowchart showing a procedure example of character line division processing.

FIG. 2 is a flowchart showing a procedure example of character line division processing according to the present embodiment. It is assumed that a processing-target document, such as a receipt, is placed at a predetermined position of the copy machine 100 so as to be capable of being scanned by the scanner 101.

At S201, a scanned image is acquired by optically scanning a document (original) by the scanner 101 of the copy machine 100. The scanned image acquired by the copy machine 100 is sent to the information processing apparatus 110 by the communication processing with the communication unit 117 of the information processing apparatus 110 by the communication unit 103. The CPU 111 of the information processing apparatus 110 stores the scanned image sent from the copy machine 100 in the HDD 114. FIG. 3 is a diagram showing a document scanned image example. The scanned image 301 is an image obtained by scanning a receipt. In the present embodiment, although a scanned image of a receipt is used, the scanned image may be a scanned image of a document other than a receipt, in which the space between character lines (i.e. lines of character strings) is narrow and character line contact in which character lines come into contact with each other occurs at a plurality of portions, or a document in which characters come into contact with each other between lines due to dust or noise during the scan and character line contact occurs. On the side above a ruled line area 302 of the scanned image 301, which is an area corresponding to the ruled line of the document, the state is such that the space between character lines (i.e. lines of the character string) is wide and it is possible to recognize the character of each character string. On the side under the ruled line area 302 of the scanned image 301, the state is such that the space between character lines of the character string is narrow and it is hard to recognize the character of each character string. Details of the scanned image 301 will be described later.

Explanation is returned to the flow in FIG. 2. At S202, the CPU 111 performs binarization processing for the scanned image 301 and stores the binary image acquired by the CPU 111 performing the binarization processing in the RAM 113. The binarization processing is processing to convert an image into two tones of white and black and the pixel of a color darker than a threshold value is converted into a black pixel and the pixel of a color paler than the threshold value into a white pixel. In present embodiment, although a method is used in which the threshold value is determined from a histogram of the entire scanned image 301 and a binary image is created, the specific method is not limited as long as an image is converted into a binary image of white and black with accuracy that enables character recognition to be performed afterward.

At S203, the CPU 111 performs ruled line removal (ruled line area removal) for the binary image acquired by the processing at S202. The ruled line removal is processing to detect a ruled line area within the binary image, which corresponds to the ruled line area 302 of the scanned image 301, and remove the detected ruled line area from the binary image. As the removal-target ruled line area, in a case of a scanned image of a document in which, for example, a solid line or a ruled line, such as a ruled line in the vertical direction, exists, not only a broken line like the ruled line area 302, the ruled line removal is performed similarly for the binary image obtained by the binarization processing for the scanned image.

At S204, the CPU 111 performs noise removal, such as morphology conversion processing, for the binary image for which the processing at S203 has been performed. There is a case where a minute black pixel is mixed in the scanned image 301 as noise by dust being mixed during a scan and the noise is removed. In the present embodiment, although the noise removal is performed by performing the morphology conversion processing for the binary image, the specific method is not limited as long as nose is removed with accuracy that enables OCR to be performed afterward.

At S205, the CPU 111 performs first character line division for the binary image for which the processing at S204 has been performed and stores the information on the character line divided by the CPU 111 in the RAM 113. In the present embodiment, the entire binary image is projected in the line width direction and the area in which the number of black pixels in the line height direction is larger than or equal to a predetermined threshold value is determined to be a character line. Projecting the entire binary image in the line width direction is equivalent to acquiring the number of black pixels by counting the number of black pixels in the line width direction at each position in the line height direction. For example, it may also be possible to create a projection histogram of the black pixel in the line direction, which represents the appearance frequency of the black pixel in the line width direction, and acquire the number of black pixels based on the created projection histogram of the black pixel. The CPU 111 stores the information on the position, the height, and the width of the area determined to be a line in the RAM 113 as character line information.

At S206, the CPU 111 performs character division for the binary image for which the processing at S204 has been performed based on the character line information acquired by the processing at S205 and stores the information on the divided character obtained by the CPU 111 performing the character division in the RAM 113. In the present embodiment, each divided line is projected in the direction perpendicular to the character line and the area in which the number of black pixels is larger than or equal to a predetermined threshold value is determined to be a character. The CPU 111 acquires the information on the position, the height, and the width of the area determined to be a character as character information and stores the information in the RAM 113 in association with the character line information. As the character line division at S205 and the character division at S206, methods other than those of the present embodiment may be used as long as it is possible to divide the character area in the binary image of a document in units of character lines and in units of characters except for a character that comes into contact with another character in the vertically adjacent character line.

At S207, the CPU 111 performs the OCR processing for the binary image for which the processing at S204 has been performed based on the character information acquired at S206 and stores the OCR processing results in the RAM 113 in association with the character information. In the OCR processing results, a plurality of recognition results candidates is stored in each piece of character information and reliability is associated with each recognition results candidate. In the present embodiment, the reliability is a numerical value (0 to 255) representing the degree of matching between the feature quantity of the recognition-target character and the feature quantity of the character of the OCR processing results. In the OCR processing results, a lower numerical value of reliability indicates that the matching rate between the recognition-target character and the character of the OCR processing results is higher, and indicates that the OCR processing results are more reliable results. The method of representing reliability is not limited as long as it is possible to compare the accuracy of the OCR results of each character in an objective manner.

At S208, the CPU 111 derives a character height mode H from the height information on each character, which is acquired at S205, and stores the character height mode H, which is the derivation results, in the RAM 113 in association with the character information. In the present embodiment, a frequency graph of the character height is created by using the character height information and the median whose frequency is the highest is defined as the character height mode H.

At S209, the CPU 111 performs character attribute determination processing, assigns the character attribute to each character (recognition-target character) acquired by the processing at S207, and stores each character in the RAM 113 in association with the character information.

Figure 4:
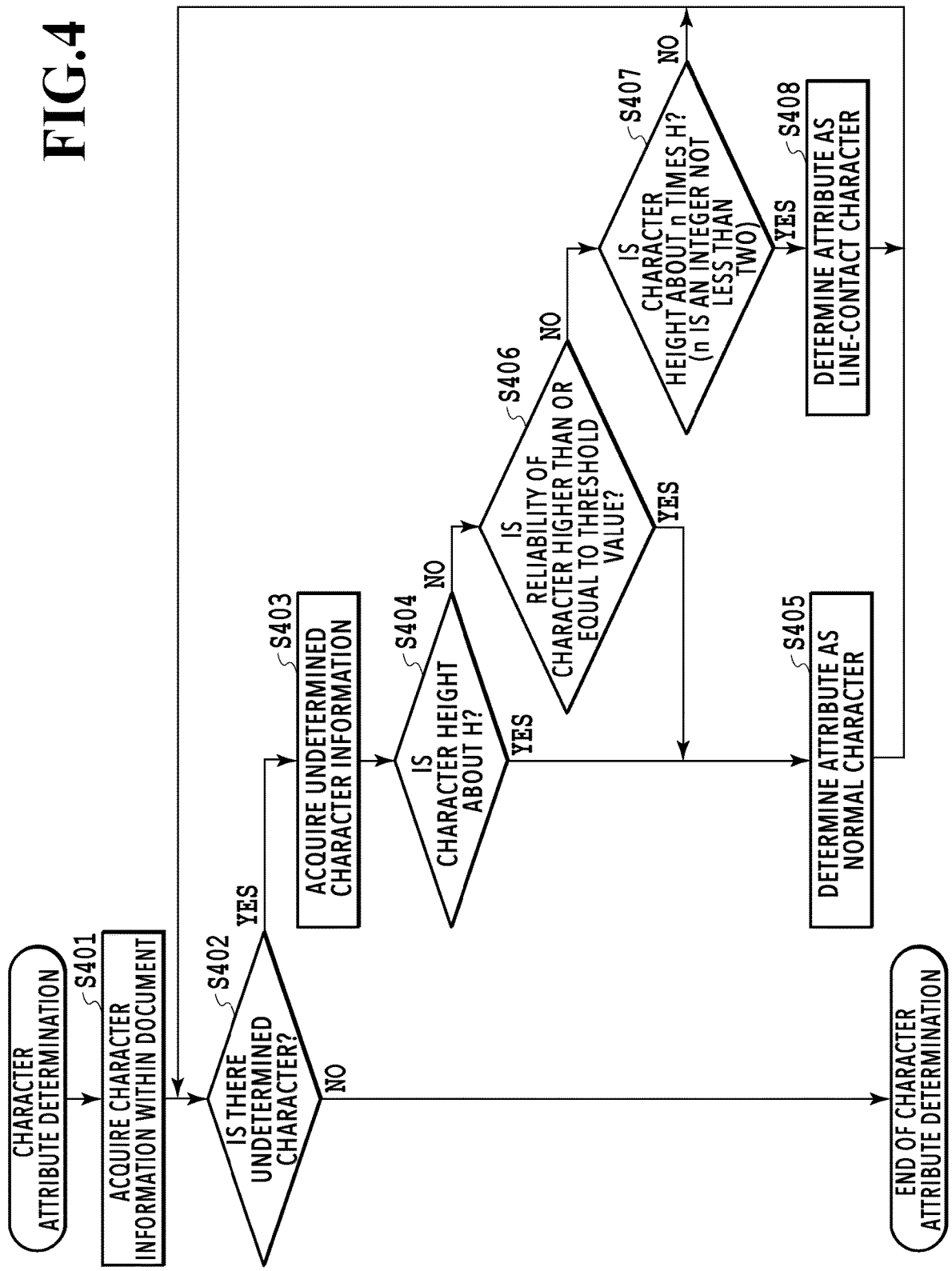
FIG. 4 is a flowchart showing a procedure example of character attribute determination processing.

FIG. 4 is a flowchart showing a procedure example of the character attribute determination processing according to the present embodiment. At S401, the CPU 111 acquires the character information on each character within the character area of a document from the RAM 113.

At S402, the CPU 111 searches for a character whose character attribute is not determined yet in the character information within the character area of the document, which is acquired at S401, and determines whether or not an undetermined character exists. In a case of obtaining the determination results that an undetermined character exists (YES at S402), the CPU 111 moves the processing to S403. In a case of obtaining the determination results that no undetermined character exist (NO at S402), the CPU 111 terminates the character attribute determination processing.

At S403, the CPU 111 acquires character information including the character height and the character reliability of the undetermined character determined to be an undetermined character by the processing at S402. At S404, S406, and S407 that follow S403, the character attribute of the undetermined character is determined.

At S404, the CPU 111 determines whether or not the character height of the processing-target character is about the same as the character height mode H acquired at S208 based on the character information acquired at S403. In a case of obtaining the determination results that the character height of the processing-target character is about the same as the character height mode H (YES at S404), the CPU 111 moves the processing to S405. In a case of obtaining the determination results that the character height of the processing-target character is not about the same as the character height mode H (NO at S404), the CPU 111 moves the processing to S406. In the present embodiment, the character height of the character whose character height is within ±30% of the character height mode H is determined to be about the same as the character height mode H. About the same as the character height mode H is not limited to the character height within ±30% of the character height mode H. About the same as the character height mode H may be a narrower range, such as within ±25% of the character height mode H, or a wider range, such as within ±35% of the character height mode H.

At S405, the CPU 111 determines that the character attribute of the processing-target character as a normal character. The CPU 111 stores the normal character, which is the character attribute determination results, in the RAM 113 in association with the character information acquired at S403. After storing the character attribute determination results in the RAM 113, the CPU 111 moves the processing to S402.

At S406, the CPU 111 determines whether or not the reliability of the processing-target character is higher than or equal to a threshold value based on the character information acquired at S403. In a case of obtaining the determination results that the reliability of the processing-target character is higher than or equal to the threshold value (YES at S406), the CPU 111 moves the processing to S405. Then, as described above, the CPU 111 determines that the character attribute is the normal character and stores the normal character in the RAM 113 in association with the character information acquired at S403. In a case of obtaining the determination results that the reliability of the processing-target character is less than the threshold value and the reliability of the processing-target character is not higher than or equal to the threshold value (NO at S406), the CPU 111 moves the processing to S407. In the present embodiment, the threshold value is set to 150. The threshold value for the character reliability determination is not limited to 150. It may also be possible to set the threshold value for the character reliability determination to a numerical value smaller than 150 or to a numerical value greater than 150.

At S407, the CPU 111 determines whether or not the acquired character height (character height of processing-target character) is about the same as an integer (not less than two) multiple of the character height mode H. In the present embodiment, the character height within ±30% of the integer (not less than two) multiple of the character height mode H is determined to be about the same as the integer (not less than two) multiple of the character height mode H. About the same as the integer (not less than two) multiple of the character height mode H is not limited to this range. It may also be possible to set about the same as the integer (not less than two) multiple of the character height mode H to a narrower range, such as a range from −25% of the integer (not less than two) multiple of the character height mode H to +25% of the integer (not less than two) multiple of the character height mode H. It may also be possible to set about the same as the integer (not less than two) multiple of the character height mode H to a wider range, such as a range from −35% of the integer (not less than two) multiple of the character height mode H to +35% of the integer (not less than two) multiple of the character height mode H. In a case of obtaining the determination results that the character height of the processing-target character is about the same as the integer (not less than two) multiple of the character height mode H (YES at S407), the CPU 111 moves the processing to S408. In a case of obtaining the determination results that the character height of the processing-target character is not about the same as the integer (not less than two) multiple of the character height mode H (NO at S407), the CPU 111 moves the processing to S402.

At S408, the CPU 111 determines the character attribute of the processing-target character as a line-contact character. The CPU 111 stores the line-contact character, which is the character attribute determination results, in the RAM 113 in association with the character information acquired at S403. After storing the character attribute determination results in the RAM 113, the CPU 111 moves the processing to S402.

By performing the processing at S402 to S408 described above, the character attribute is determined for all the characters within the character area of the document, for which the character attribute determination processing has not been performed.

Explanation is returned to the flow in FIG. 2. At S210, the CPU 111 performs the character line attribute determination processing, assigns the character line attribute to each character line, and stores the character line attribute in the RAM 113 in association with the character line information.

Figure 5:
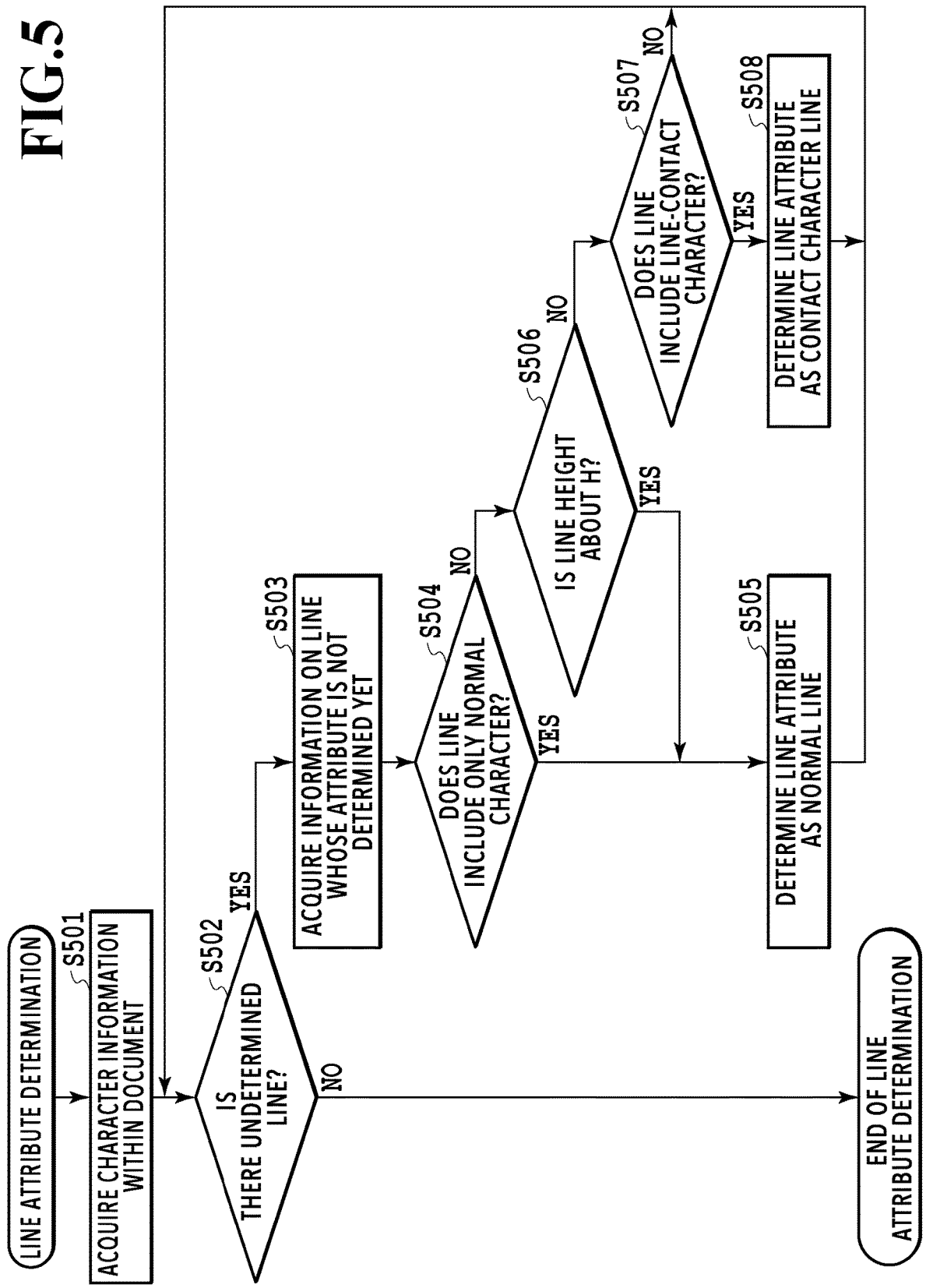
FIG. 5 is a flowchart showing a procedure example of character line attribute determination processing.

FIG. 5 is a flowchart showing a procedure example of the character line attribute determination processing according to the present embodiment. At S501, the CPU 111 acquires the character line information on each character line and the character attribute information on the character included in the character line within the character area of the document from the RAM 113.

At S502, the CPU 111 searches for a character line whose character line attribute is not determined yet in the character attribute information on the character acquired at S501 and determines whether or not an undetermined character line exists. In a case of obtaining the determination results that an undetermined character line exists (YES at S502), the CPU 111 moves the processing to S503. In a case of obtaining the determination results that no undetermined character line exists (NO at S502), the CPU 111 terminates the character line attribute determination processing.

At S503, the CPU 111 acquires the character attribute of the character included in the undetermined character line determined to be an undetermined character line by the processing at S502 and the character line height information. At S504, S506, and S507 that follow S503, the character line attribute of the undetermined character line is determined.

At S504, the CPU 111 determines whether or not the character attribute of all the characters within the character line is the normal character. In a case of obtaining the determination results that the character attribute of all the characters within the character line is the normal character (only the normal character) (YES at S504), the CPU 111 moves the processing to S505. In a case of obtaining the determination results that the characters within the character line include the character whose character attribute is not the normal character and the character attribute is not only the normal character (NO at S504), the CPU 111 moves the processing to S506.

At S505, the CPU 111 determines that the character line attribute is a normal character line. The CPU 111 stores the normal character line, which is the character line attribute determination results, in the RAM 113 in association with the character line information along with the information acquired at S503. After storing the character line attribute determination results in the RAM 113, the CPU 111 moves the processing to S502.

At S506, the CPU 111 determines whether or not the character line height of the processing-target character line is about the same as the character height mode H acquired at S208 based on the character line height information acquired at S503. In the present embodiment, the character line height within ±30% of the character height mode H is determined to be about the same as the character height mode H. In a case of obtaining the determination results that the character line height of the processing-target character line is about the same as the character height mode H (YES at S506), the CPU 111 moves the processing to S505. In a case of obtaining the determination results that the character line height of the processing-target character line is not about the same as the character height mode H (NO at S506), the CPU 111 moves the processing to S507.

At S507, the CPU 111 determines whether or not one or more characters whose character attribute of the processing-target character is the line-contact character exist within the character line. In a case of obtaining the determination results that one or more characters whose character attribute of the processing-target character is the line-contact character exist within the character line (YES at S507), the CPU 111 moves the processing to S508. In a case of obtaining the determination results that not even one character whose character attribute of the processing-target character is the line-contact character exists within the character line (NO at S507), the CPU 111 moves the processing to S502.

At S508, the CPU 111 determines that the character line attribute is a contact character line. The CPU 111 stores the contact character line, which is the character line attribute determination results, in the RAM 113 in association with the character line information along with the information acquired at S503. After storing the character line attribute determination results in the RAM 113, the CPU 111 moves the processing to S502.

By performing the processing at S502 to S508 described above, the character line attribute is determined for all the character lines within the character area of the document, for which the character line attribute determination processing has not been performed.

FIG. 7 is a diagram showing a binary image 700 after performing the processing from the binarization processing at S202 to the character line attribute determination processing at S210 for the scanned image 301 shown in FIG. 3. A broken line rectangular area 701 within the binary image 700 indicates the character line whose character line attribute is the normal character line. A solid line rectangular area 702 within the binary image 700 indicates the character line whose character line attribute is the contact character line. In the solid line rectangular area 702, the first "t" of "Subtotal" in the first character line and "(" in the second character line are in contact. Similarly, in the solid line rectangular area 702, "0" in the first character line and ")" in the second character line, the "u" of "included" in the second character line and the "l" of "Total" in the third character line, and ")" in the second character line and "0" in the third character line are in contact. That is, in the solid line rectangular area 702 of the binary image 700, the line contact occurs at four portions across three lines.

Explanation is returned to the flow in FIG. 2. At S211, the CPU 111 performs second character line division for the character line that is a character line in the binary image and whose character line attribute is the contact character line and stores the information on the character line divided by the CPU 111 in the RAM 113.

Figure 6:
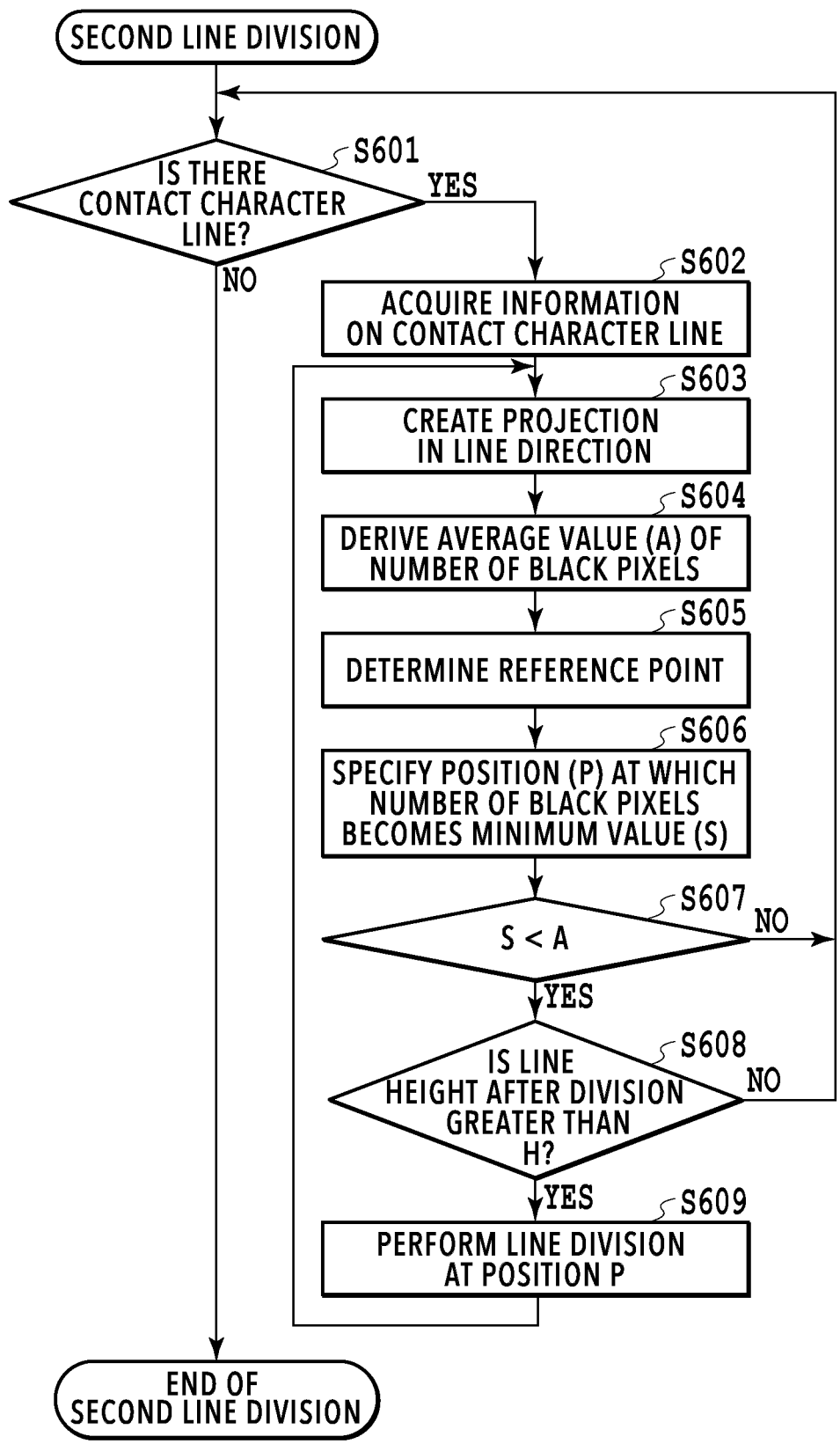
FIG. 6 is a flowchart showing a procedure example of second character line division processing.

FIG. 6 is a flowchart showing a procedure example of second character line division processing according to the present embodiment. At S601, the CPU 111 acquires the character line attribute information on each character line, which is obtained by the determination processing at S210, from the RAM 113. Then, the CPU 111 determines whether or not a character line whose character line attribute of the processing-target character line is the contact character line and for which the second line division processing has not been performed exists within the character area of the scanned image (binary image) based on the acquired character line attribute information on each character line. In a case of obtaining the determination results that a character line whose character line attribute is the contact character line and for which the second character line division processing has not been performed exists within the character area of the scanned image (binary image) (YES at S601), the CPU 111 moves the processing to S602. In a case of obtaining the determination results that a character line whose character line attribute is the contact character line and for which the second character line division processing has not been performed does not exist within the character area of the scanned image (binary image) (NO at S601), the CPU 111 terminates the second character line division processing.

At S602, the CPU 111 acquires the character line information indicating the position, the height, and the width of the character line whose character line attribute is the contact character line and for which the second character line division has not been performed from the RAM 113. That is, the CPU 111 acquires the character line information indicating the position, such as the line upper-end position and the line lower-end position, the height and the like of the character line of interest.

At S603, the CPU 111 creates a projection in the character line direction for the portion corresponding to the contact character line in the binary image of the scanned image 301 and acquires projection information on the rectangular area including the portion corresponding to the processing-target contact character line. In the present embodiment, the CPU 111 acquires projection information on the solid line rectangular area 702 of the binary image 700.

At S604, the CPU 111 derives an average value A of the number of black pixels based on the projection information acquired at S603. For example, the CPU 111 derives the total value of the number of black pixels (count value) and derives the average value A (average value of count value) of the total value of the number of black pixels by dividing the derived total value of the number of black pixels by the number of pixels (count number) in the height direction of the processing-target contact character line.

At S605, the CPU 111 determines a reference point for specifying a character line division position in a projected image of the solid line rectangular area 702 of the binary image 700.

Figure 8:
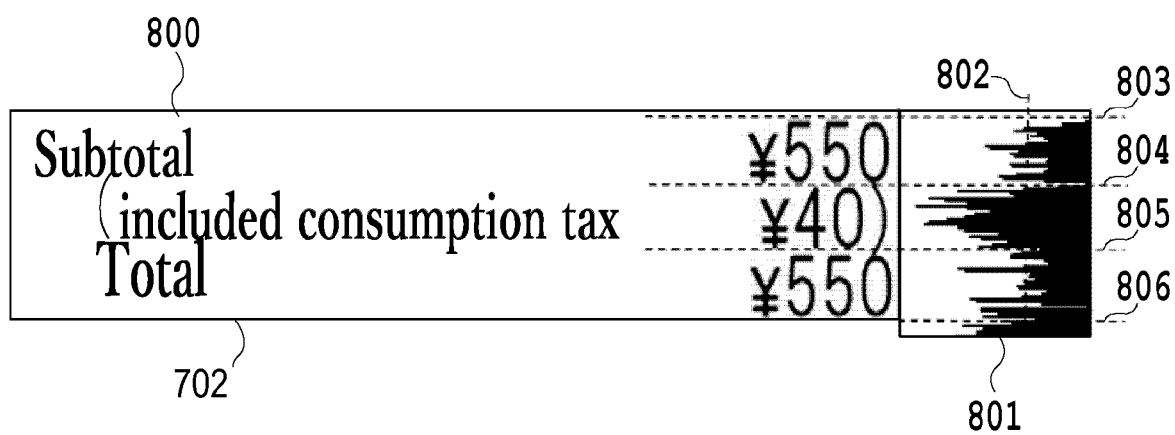
FIG. 8 is a diagram showing a binary image example of an area including a contact character line and a projected image example thereof.

FIG. 8 is a diagram showing a binary image 800 corresponding to the solid line rectangular area 702 of the binary image 700 and a projected image 801 thereof. The CPU 111 determines a position distant downward from a line upper-end position (top position) 803 of the contact character line included in the character line information acquired at S602 by the character height mode H acquired at S208 as a reference point.

At S606, the CPU 111 specifies a position P (first position) at which the number of black pixels is a minimum value S on the periphery of the reference point determined by the processing at S605. In the present embodiment, the numbers of black pixels corresponding to the ± two pixels in the direction perpendicular to the character line from the reference point are compared and the position P at which the number of black pixels is the minimum value S is determined as a division position 804. The size of the periphery of the reference point is not limited to the ± two pixels from the reference point. It may also be possible to set the size of the periphery of the reference point to ± one pixel from the reference point or to a size larger than ± two pixels from the reference point.

At S607, the CPU 111 determines whether or not the minimum value S of the number of black pixels (division position 804 in FIG. 8) is smaller than the average value A (position 802 in FIG. 8) of the number of black pixels. In a case of obtaining the determination results that the minimum value S of the number of black pixels is smaller than the average value A of the number of black pixels (less than the average value A of the number of black pixels) (YES at S607), the CPU 111 moves the processing to S608. In a case of obtaining the determination results that the minimum value S of the number of black pixels is greater than or equal to the average value A of the number of black pixels (greater than or equal to the average value of the count value), the CPU 111 moves the processing to S601.

At S608, the CPU 111 derives the character line height of the residual area after the character line division (hereinafter, also referred to as character line height after character line division) in a case where the character line division is performed at the division position 804. That is, the CPU 111 derives the height of the area on the lower side of the division position 804 in the binary image 800 in a case where the character line division is performed at the division position 804, that is, the distance from the division position 804 to a lowermost position 806 of the contact character line. Then, the CPU 111 determines whether or not the derived character line height after the character line division is greater than the character height mode H derived at S208. In a case of obtaining the determination results that the derived character line height after the character line division is greater than the character height mode H (YES at S608), the CPU 111 moves the processing to S609. In a case of obtaining the determination results that the derived character line height after the character line division is less than or equal to the character height mode H (NO at S608), the CPU 111 moves the processing to S601.

At S609, the CPU 111 performs the character line division at the division position 804 specified at S606 for the processing-target binary image 800. The character line division for the contact character line corresponds to the second character line division processing. After performing the second character line division processing, the CPU 111 moves the processing to S603.

In the binary image 800, as in the case where the character line division is performed at the division position 804, the CPU 111 performs the second character line division processing at S601 to S609 for the area on the lower side of the division position 804. Due to this, a division position 805 is specified and the character line division is performed at the specified division position 805.

Consequently, in the binary image 800, the contact character line is divided into three character lines.

As explained above, according to the present embodiment, it is possible to implement a more accurate character line division also in an original in which the space between character lines is very narrow, a scanned image of a document in which the character line contact occurs at a plurality of portions, and a scanned image of a document in which the ratio of character lines that come into contact with each other is high. As a result of that, it is possible to implement OCR processing with a higher accuracy.

Second Embodiment

For the present embodiment, only the difference from the first embodiment is explained and for the portion not explicitly described in particular, the configuration and the procedure are the same as those of the first embodiment. The processing at S201 to S208 and S210 of the character line division processing shown in FIG. 2 is the same as that in the case of the first embodiment, and therefore, explanation thereof is omitted.

In the first embodiment, the character line division processing of a document is explained, which includes the characters corresponding to the two kinds of character attribute, that is, the normal character and the line-contact character. The character line division processing may be processing for a document including characters corresponding to three or more kinds of character attribute.

For example, in a receipt, a character whose ratio of the character height to the character width (aspect ratio) is 2 (hereinafter, referred to as character of vertical double size) is used often. In the present embodiment, character attribute determination processing is explained in which a character of vertical double size whose character height is greater than that of the normal character of the character attribute is added to the determination of the character attribute.

Figure 9:
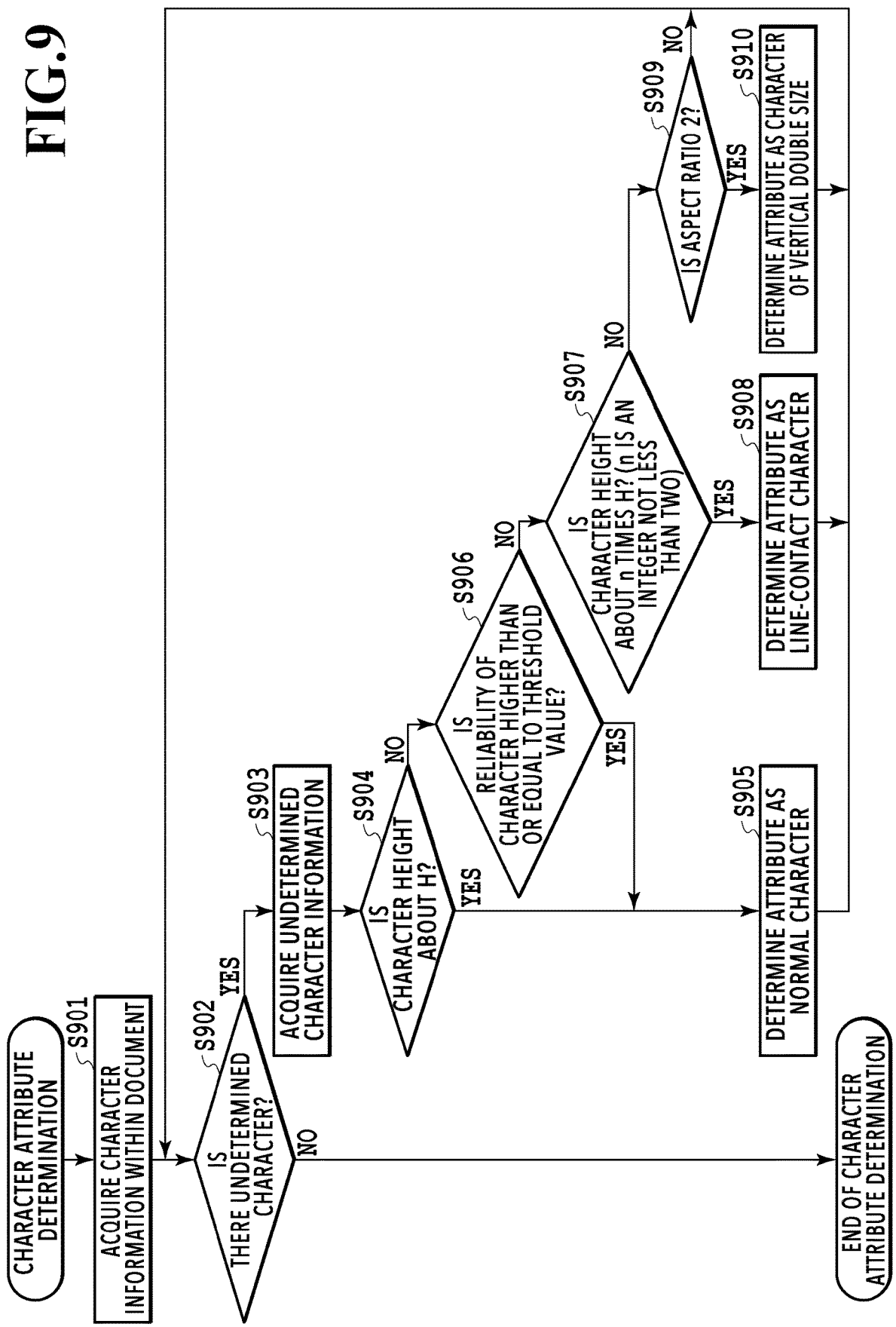
FIG. 9 is a flowchart showing a procedure example of character attribute determination processing.

FIG. 9 is a flowchart showing a procedure example of the character attribute determination processing according to the present embodiment. Each piece of processing at S901 to S908 is the same as each piece of processing at S401 to S408 in FIG. 4, and therefore, explanation thereof is omitted. That is, FIG. 9 is a flowchart obtained by adding S909 and S910 to the flow shown in FIG. 2.

At 907, in a case of obtaining the determination results that the character height of the processing-target character is not about the same as the integer (not less than two) multiple of the character height mode H (NO at S907), the CPU 111 moves the processing to S909.

At S909, the CPU 111 determines whether or not the aspect ratio of the character other than the characters determined to be the normal character or the line-contact character is 2. In a case of obtaining the determination results that the aspect ratio of the processing-target character is 2 (YES at S909), the CPU 111 moves the processing to S910. In a case of obtaining the determination results that the aspect ratio of the processing-target character is not 2 and other than 2 (NO at S909), the CPU 111 moves the processing to S902.

At S910, the CPU 111 determines that the character attribute of the processing-target character as the character of vertical double size. The CPU 111 stores the character of vertical double size, which is the character attribute determination results, in the RAM 113 in association with the character information acquired at S903. After storing the character attribute determination results in the RAM 113, the CPU 111 moves the processing to S902.

By performing the processing at S902 to S910 described above, the character attribute is determined for all the characters within the character area of the document, for which the character attribute determination processing has not been performed.

Figure 10:
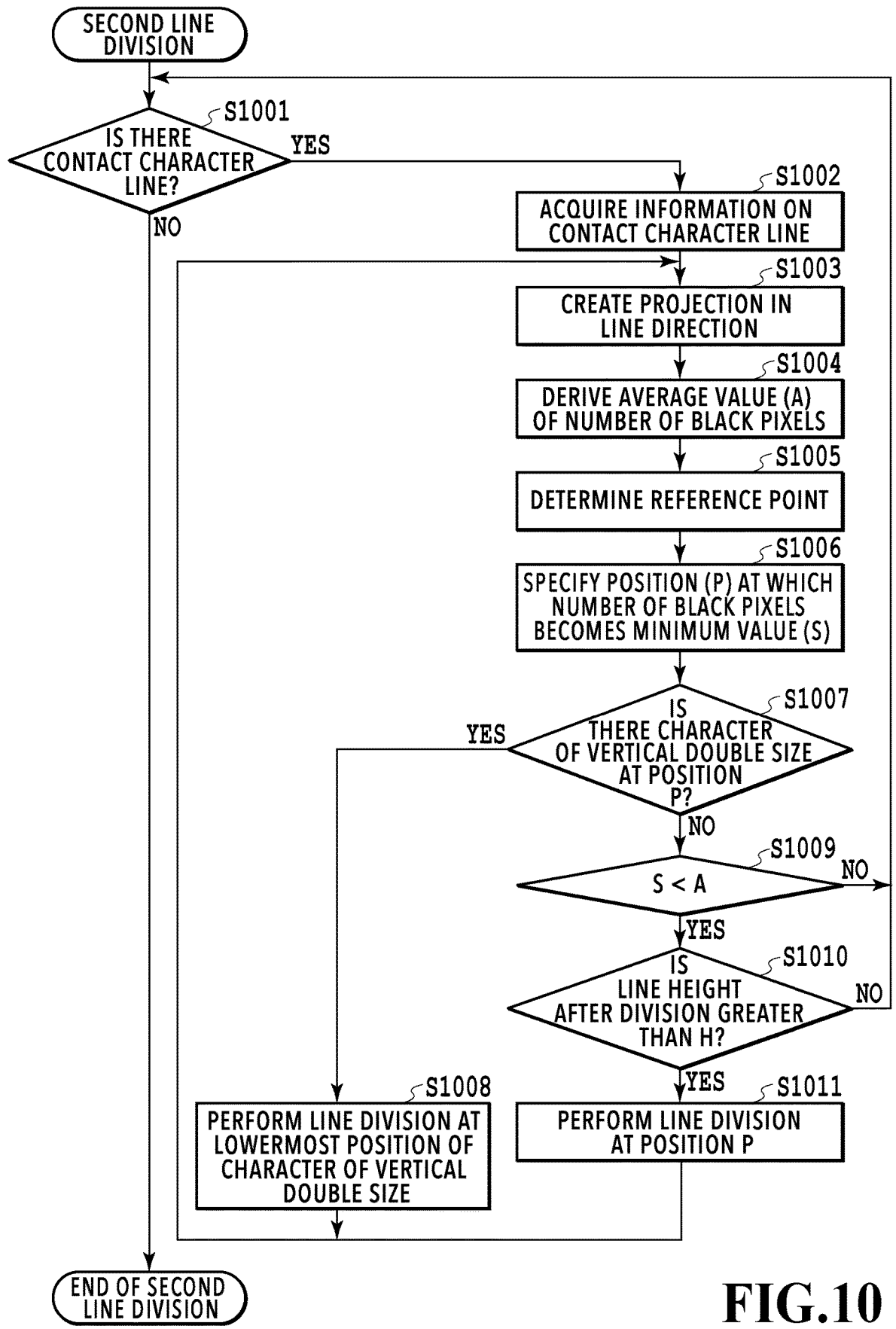
FIG. 10 is a flowchart showing a procedure example of second character line division processing.

FIG. 10 is a flowchart showing a procedure example of the second character line division processing according to the present embodiment. Each piece of processing at S1001 to S1006 and S1009 to S1011 is the same as each piece of processing at S601 to S606 and S607 to S609 in FIG. 6, and therefore, explanation thereof is omitted. That is, FIG. 10 is a flowchart obtained by adding S1007 and S1008 to the flow shown in FIG. 6.

The CPU 111 determines whether or not a character of vertical double size exists at the position P at S1007 that follows the processing at S1006 of specifying the position P at which the number of black pixels is the minimum value S. In a case of obtaining the determination results that a character of vertical double size exists at the position P (YES at S1007), the CPU 111 moves the processing to S1008. In a case of obtaining the determination results that a character of vertical double size does not exist at the position P (NO at S1007), the CPU 111 moves the processing to S1009.

At S1008, the CPU 111 changes the division position from the position P specified at S1006 and sets the division position to the lowermost position of the character of vertical double size and performs the character line division at the lowermost position of the character of vertical double size, which is set as the division position. After performing the character line division processing, the CPU 111 moves the processing to S1003. As described above, even in a case where a character of vertical double size is included in an original, it is possible to perform the character line division at a division position appropriately set.

As explained above, according to the present embodiment, it is possible to implement a more accurate character line division also in a scanned image of a document in which character lines are in contact with each other between characters whose character sizes are different and a scanned image of a document in which the ratio of character lines that come into contact with each other is high. As a result of that, it is possible to implement a higher OCR accuracy.

Third Embodiment

For the present embodiment, only the difference from the first and second embodiments is explained and for the portion not explicitly described in particular, the configuration and the procedure are the same as those of the first and second embodiments. The processing at S201 to S207 and S210 of the character line division processing shown in FIG. 2 is the same as that in the case of the first embodiment, and therefore, explanation thereof is omitted.

In the second embodiment, the character line division processing for a scanned image obtained by scanning a document including characters corresponding to the three kinds of character attribute, with a character of vertical double size being added, is explained. The character line division processing may be processing for a scanned image obtained by scanning a document including a character corresponding to the character attribute of a character whose feature (size) is different from that of the normal character of the character attribute in place of the character of vertical double size of the character attribute.

For example, at S208 in FIG. 2, the CPU 111 creates a character height frequency graph by using character height information at the time of deriving the character height mode H. In a case where a plurality of peaks exists in the created frequency graph, the CPU 111 derives peak values for defining the character attribute as, for example, such as a second mode character and a third mode character, in accordance with the number of peaks. The character of vertical double size determination processing at S909 is changed to special character determination processing for determining the second mode character and the third mode character. The processing of determination results at 909 is changed to processing to whether to set the character attribute to the second mode character or the third mode character, or not to set the character attribute in accordance with the determination results.

Then, the processing to determine whether or not a character of vertical double size exists at the position P at S1007 is changed to processing to determine whether or not the character of the second mode character or the third mode character exists at the position P. In a case where it is determined that the character of the second mode character or the third mode character exists at the position P, the character line division is performed at the lowermost position, which is the division position, of the feature character of the second mode character or the third mode character in accordance with the determination results of the determination at S1007. In a case where it is determined that no feature character exists, the CPU 111 moves the processing to S1009. At S1008, the CPU 111 changes the division position from the position P specified at S1006 and sets the lowermost position of the feature character as the division position and performs the character line division at the lowermost position of the feature character, which is set as the division position. After performing the character line division processing, the CPU 111 moves the processing to S1003. As described above, even in a case where a document includes a feature character, it is possible to perform the character line division at the appropriately set division position.

As explained above, according to the present embodiment, it is possible to implement more accurate character line division processing even in a case where character lines are in contact with each other between characters whose sizes are different in a document in which a plurality of characters whose character sizes are different exists and in a document in which the ratio of character lines that come into contact with each other is high. As a result of that, it is possible to implement a higher OCR accuracy.

Fourth Embodiment

For the present embodiment, only the difference from the first embodiment is explained and for the portion not explicitly described in particular, the configuration and the procedure are the same as those of the first embodiment.

In the second embodiment, the character line division processing is explained in which it is possible to accurately perform the character line division even in a case of the character line contact between the normal character and the character of vertical double size by adding the character of vertical double size as the character attribute. It is possible to implement more accurate character line division processing by changing a condition of the second character line division processing.

Figure 11:
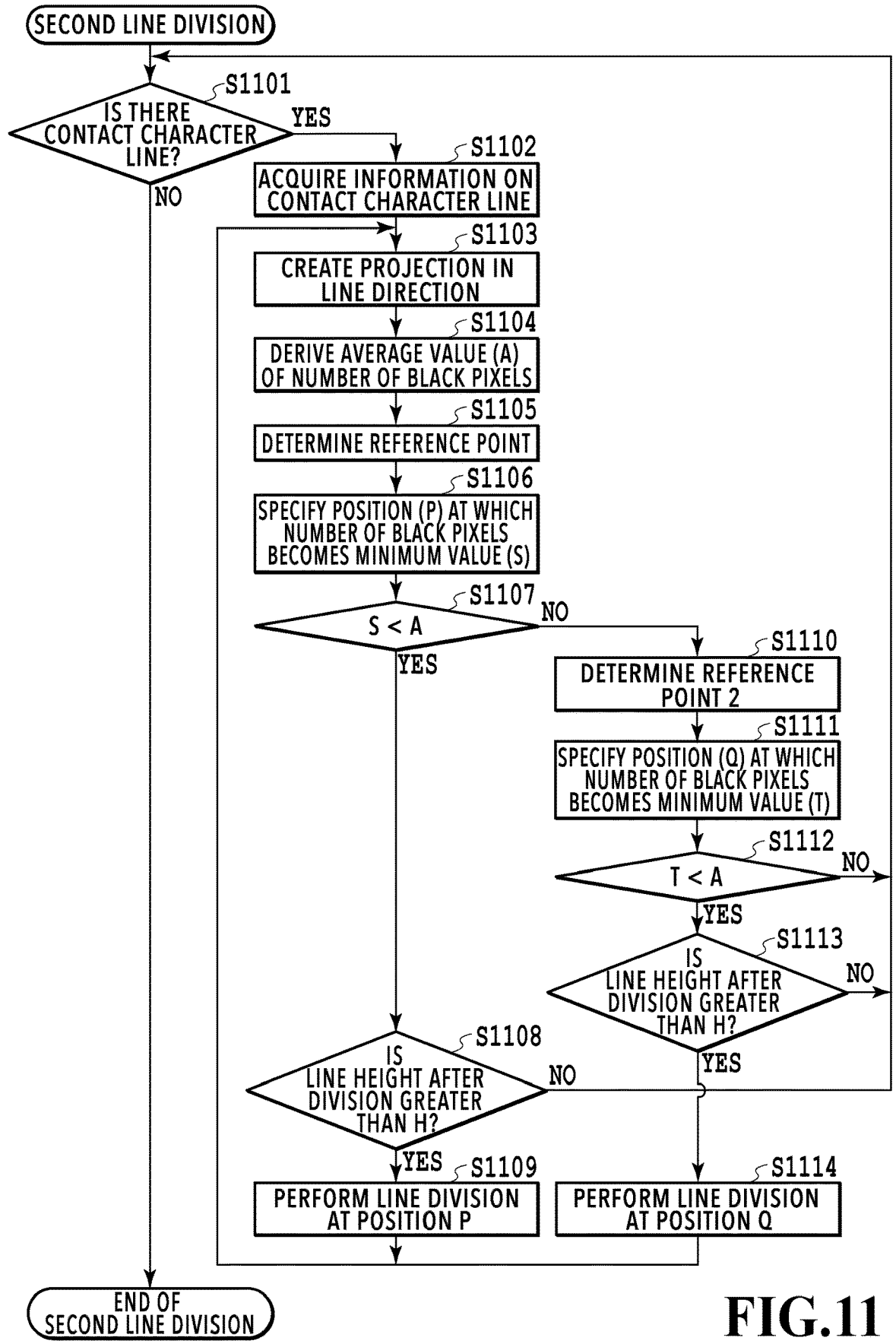
FIG. 11 is a flowchart showing a procedure example of second character line division processing.

FIG. 11 is a flowchart showing a procedure example of the second character line division processing according to the present embodiment. Each piece of processing at S1101 to S1109 is the same as each piece of processing at S601 to S609 in FIG. 6, and therefore, explanation thereof is omitted. That is, FIG. 11 is a flowchart obtained by adding S1110 to S1114 to the flow shown in FIG. 6.

In a case of obtaining the determination results that the minimum value S of the number of black pixels (minimum value of count value) is greater than or equal to the average value A of the number of black pixels (average value of count value) at S1107 (NO at S1107), the CPU 111 moves the processing to S1110. In a case of obtaining the determination results that the minimum value S of the number of black pixels is less than the average value A of the number of black pixels (YES at S1107), the CPU 111 moves the processing to S1108 and as in the first embodiment, performs the determination of whether to perform the character line division processing at the position P at S1108.

At S1110, the CPU 111 specifies a position distant downward from the reference point specified at S1105 by the character height mode H acquired at S208 as a new reference point 2. At this time, the CPU 111 acquires the number of black pixels on the periphery of the reference point 2. In the present embodiment, as in the first embodiment, the size of the periphery of the reference point is not limited to ± two pixels from the reference point. The size of the periphery of the reference point may be ± one pixel from the reference point or may be larger than the size of the periphery ± two pixels from the reference point.

At S1111, the CPU 111 compares the numbers of black pixels corresponding to ± two pixels in the direction perpendicular to the character line from the new reference point 2 specified by the processing at S1110 and specifies a position Q (second position) at which the number of black pixels is a minimum value T as the division position 804. The size of the periphery of the reference point is not limited to ± two pixels from the reference point. The size of the periphery of the reference point may be ± one pixel from the reference point or may be larger than the size of the periphery ± two pixels from the reference point.

At S1112, the CPU 111 determines whether or not the minimum value T of the number of black pixels used for specification of the position Q at S111 is smaller than the average value A of the number of black pixels derived at S1104. In a case of obtaining the determination results that the minimum value T of the number of black pixels is smaller than the average value A of the number of black pixels (less than the average value A of the number of black pixels) (YES at S1112), the CPU 111 moves the processing to S1113. In a case of obtaining the determination results that the minimum value T of the number of black pixels is greater than or equal to the average value A of the number of black pixels (NO at S1112), the CPU 111 moves the processing to S1101.

At S1113, the CPU derives, as in the processing at 5608, the character line height after the character line division in a case where the character line division processing is performed at the position Q specified at S1111. That is, the CPU 111 derives the height of the area on the lower side of the division position in the binary image in a case where the character line division is performed by taking the position Q specified at S1111 as the division position, that is, the distance from the division position to the lowermost position of the contact character line. Then, the CPU 1111 determines whether or not the derived character line height after the character line division is greater than the character height mode H derived at S208. In a case of obtaining the determination results that the derived character line height after the character line division is greater than the character height mode H (YES at S1113), the CPU 111 moves the processing to S1114. In a case of obtaining the determination results that the derived character line height after the character line division is less than or equal to the character height mode H (NO at S1113), the CPU 111 moves the processing to S1101.

At S1114, the CPU 111 performs the character line division processing at the position Q specified at S1111 for the processing-target binary image 800. This character line division processing for the contact character line corresponds to the second character line division processing. After performing the second character line division processing, the CPU 111 moves the processing to S1103.

As explained above, according to the present embodiment, it is possible to implement more accurate character line division processing without adding the character attribute also in a document in which character lines are in contact with each other between characters whose character sizes are different and a document in which the ratio of character lines that come into contact with each other is high. As a result of that, it is possible to implement a higher OCR accuracy.

Fifth Embodiment

For the present embodiment, only the difference from the first embodiment is explained and for the portion not explicitly described in particular, the configuration and the procedure are the same as those of the first embodiment.

In the first embodiment, the character line division processing of an original including characters corresponding to the character lines at which the character line contact occurs across three character lines is explained. The character line division processing may be processing of an original including characters corresponding to the character lines at which the character line contact occurs across four or more character lines.

Figure 12:
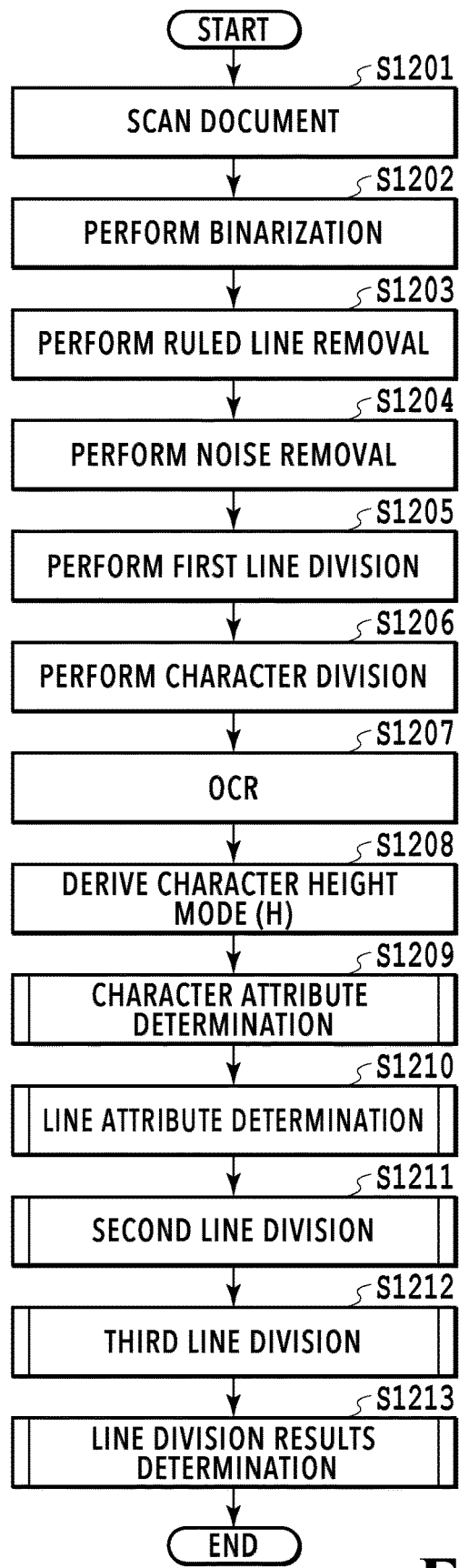
FIG. 12 is a flowchart showing a procedure example of character line division processing.

FIG. 12 is a flowchart showing a procedure example of the character line division processing according to the present embodiment. Each piece of processing at S1201 to S1211 is the same as each piece of processing at S201 to S211 in the first embodiment, and therefore, explanation thereof is omitted. That is, FIG. 12 is a flowchart obtained by adding S1212 and S1213 to the flow shown in FIG. 2.

The CPU 111 performs third character line division processing at S1212 that follows S1211 at which the second character line division processing is performed. The procedure of the third character line division processing is the same as that of the second character line division processing. In the second character line division processing, from the upper end of the contact character line, the reference point and the position at which the number of black pixels is the minimum value are specified. In contrast to this, in the third character line division processing, from the lower end of the contact character line (line lower-end position), the reference point and the position at which the number of black pixels is the minimum value are specified.

Figure 13:
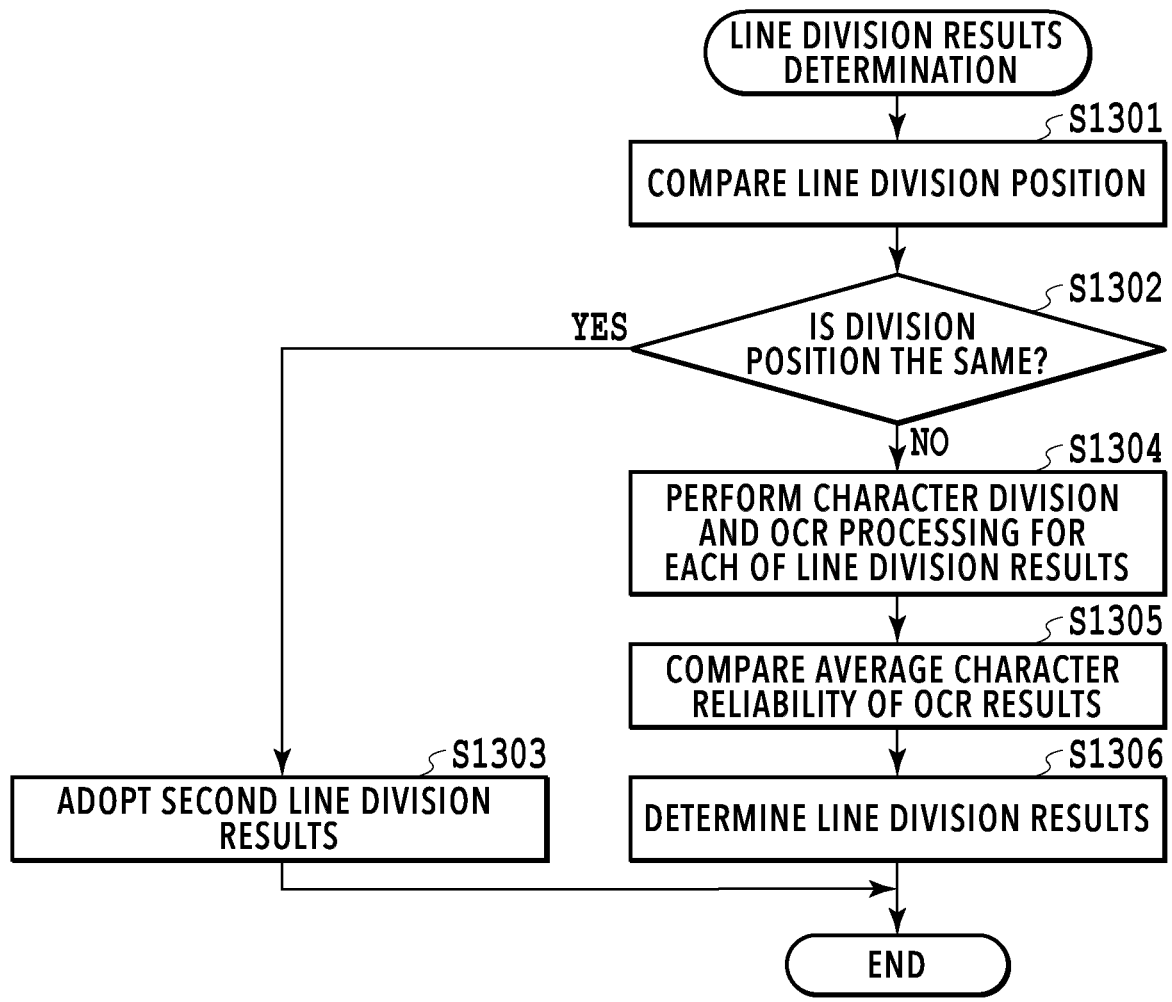
FIG. 13 is a flowchart showing a procedure example of character line division results determination processing.

At S1213, the CPU 111 compares the second line division processing results and the third line division processing results and performs processing to determine line division results in accordance with the comparison results. FIG. 13 is a flowchart showing a procedure example of the character line division results determination processing according to the present embodiment.

At S1301, the CPU 111 compares the second character line division position specified at S1211 and the third character line division position specified at S1212 for each character line.

At S1302, the CPU 111 determines whether or not the second character line division position and the third character line division position are the same. In a case of obtaining the determination results that the second character line division position and the third character line division position are the same (YES at S1302), the CPU 111 moves the processing to S1303. In a case of obtaining the determination results that the second character line division position and the third character line division position are not the same because there is a difference in the division position (NO at S1302), the CPU 111 moves the processing to S1304.

At S1303, the CPU 111 adopts the second character line division results as the final character line division results. Due to this, the character line division processing for the contact character line is determined at the position of the character line division performed in the second character line division processing.

At S1304, the CPU 111 performs character division processing for the second character line division results and the third character line division results, respectively, and then performs the OCR processing subsequently.

Further, at S1305, the CPU 111 derives the average character reliability by using each of the OCR processing results derived at S1304 and compares each derived average character reliability. The average character reliability is an average value of the character reliability corresponding to each of the character line division results.

The CPU 111 derives the average character reliability by using the OCR processing results corresponding to the second character line division results. The CPU 111 derives the average character reliability by using the OCR processing results corresponding to the third character line division processing results. The CPU 111 compares the derived average character reliability corresponding to the second character line division processing results and the derived average character reliability corresponding to the third character line division processing results.

At S1306, the character line division processing results whose numerical value of the average character reliability is low, which indicate that the matching rate between the recognition-target character and the character of the OCR processing results is high in the OCR processing results, are adopted as the final character line division processing results. Due to this, the character line division processing for the contact character line is determined at the position of the character line division performed in the second character line division processing or the third character line division processing, which is adopted in accordance with the average character reliability. In the present embodiment, the average character reliability of the entire contact character line is compared. It may also be possible to make a comparison for each character line by deriving the average character reliability of each character line within the contact character line and adopt the results whose reliability is higher. Further, similarly, it may also be possible to compare the character reliability for each character and adopt the results whose reliability is higher.

As explained above, according to the present embodiment, it is possible to implement more accurate character line division processing also in a document in which the space between character lines is narrow and the line contact occurs across a very large number of character lines and a document in which the ratio of the character lines that come into contact with each other is high. As a result of that, it is possible to implement a higher OCR accuracy.

Figure 14:
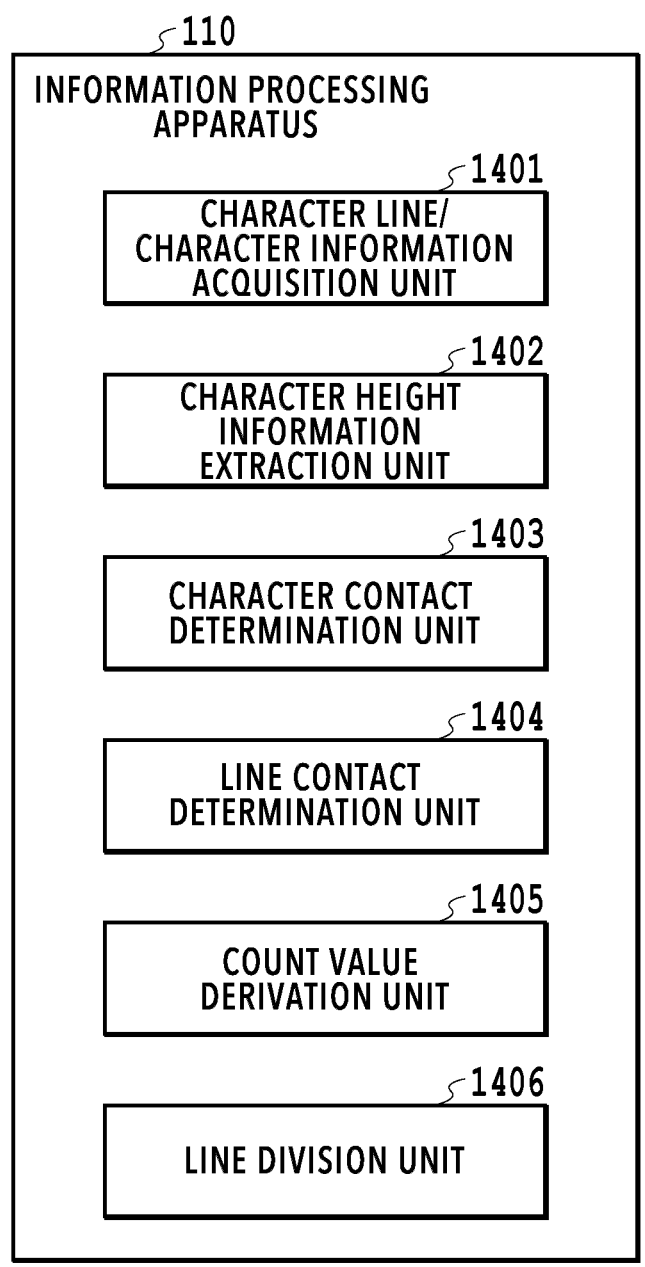
FIG. 14 is a block diagram showing a functional configuration example in an information processing apparatus.

FIG. 14 is a functional block configuration diagram of the information processing apparatus 110 of the first, second, third, fourth, and fifth embodiments described above at the time of the CPU 111 executing programs stored in the ROM 112. Although each of components 1401 to 1406 shown schematically is performed by the CPU 111 having executed the program, it may also be possible to implement a part of them by hardware. The information processing apparatus 110 has a character line/character information acquisition unit 1401, a character height information extraction unit 1402, a character contact determination unit 1403, a line contact determination unit 1404, a count value derivation unit 1405, and a line division unit 1406.

The character line/character information acquisition unit 1401 acquires character line information indicating the size and the position of each character line within a binary image obtained by binarizing a scanned image obtained by optically reading a document. Further, the character line/character information acquisition unit 1401 acquires character information indicating the size and the position of each character within the binary image. The character height information extraction unit 1402 acquires character height information by extracting the character height information from the character information.

The character contact determination unit 1403 determines whether a character comes into contact with another character in the height direction based on the character height information. The character line contact determination unit 1404 determines whether the character line of interest comes into contact with another character line in the height direction based on the character line information and the determination results by the character contact determination unit 1403.

The count value derivation unit 1405 derives the count value by counting the number of black pixels in the width direction in the character line of interest in the character line of interest that is determined to come into contact with another character line by the character line contact determination unit 1404.

The character line division unit 1406 performs the character line division for the character line of interest that is determined to come into contact with another character line by the character line contact determination unit 1404 by taking the position at which the count value is the minimum in the height direction of the character line of interest as the character line division position.

Other Embodiments

In the above, the method is explained in which the position distant downward from the line upper-end position of a contact character line by the character height mode is determined to be a reference point and in a case where the height of the area on the lower side of the division position at the time of performing the character line division on the periphery of the reference point or the like satisfies a predetermined condition, the division position is specified by taking the periphery of the reference point as a reference. The method of specifying the division position is not limited to this. The method may be a method in which the position distant upward from the line lower-end position of a contact character line by the character height mode is determined to be a reference point and in a case where the height of the area on the upper side of the division position at the time of performing the character line division on the periphery of the reference point or the like satisfies a predetermined condition, the division position is specified by taking the periphery of the reference point as a reference. In this case, it is sufficient to perform the setting by reading the upward direction as the downward direction and so on, such as by changing the upper side in the explanation of the first, second, and fourth embodiments to the lower side.

In the above, although explanation is given by taking the copy machine 100 that optically reads a document with the scanner 101 as an example, the device is not limited to the machine such as this. For example, the device may be a mobile terminal, such as a smartphone and a tablet, comprising a camera capable of optically reading a document and a communication unit capable of communicating with the information processing apparatus 110.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiments, it is possible to appropriately perform character line division for a scanned image obtained by optically reading a document.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-110205, filed Jun. 13, 2019, which is hereby incorporated by reference wherein in its entirety.

What is claimed is:

1. A character line division apparatus comprising:
an acquisition unit configured to acquire character line information including a size and a position of each character line within a binary image obtained by binarizing a scanned image obtained by optically reading a document, and character information including a size and a position of each character in a character line within the binary image;
a first determination unit configured to determine whether a character comes into contact with another character in a height direction based on the character height information;
a second determination unit configured to determine whether a character line of interest among character lines in the document comes into contact with another character line in a height direction based on the character line information and determination results by the first determination unit;
an obtaining unit configured to obtain a count value obtained by counting a number of black pixels in a width direction in a character line of interest in the character line of interest determined to come into contact with another character line by the second determination unit; and
a character line division unit configured to perform character line division for the character line of interest determined to come into contact with another character line by the second determination unit on a periphery of a reference point obtained from a position of a character line indicated by the character line information and the character height information by taking a first position at which the count value becomes a minimum in a height direction of the character line of interest as a character line division position.

2. The character line division apparatus according to claim 1, wherein
the character line division unit performs character line division by taking the first position as the character line division position in a case where a minimum value of the count value is less than an average value obtained from a total value of the count value and a height of a character line on a lower side or on an upper side of the first position at the time of division at the first position is greater than a character height obtained from the character height information.

3. The character line division apparatus according to claim 2, wherein
the character line division unit performs character line division by taking a second position at which the count value becomes a minimum as the character line division position on a periphery of a second reference point obtained from the reference point and the character height information in a case where a minimum value of the count value is greater than or equal to an average value obtained from a total value of the count value.

4. The character line division apparatus according to claim 2, wherein
the character line division unit performs character line division by taking a second position as the character line division position in a case where a minimum value of the count value is greater than or equal to an average value obtained from a total value of the count value and a count value at the second position at which the count value becomes a minimum on a periphery of a second reference point obtained from the reference point and the character height information is less than the average value.

5. The character line division apparatus according to claim 2, wherein
the character line division unit performs character line division by taking a second position as the character line division position in a case where a minimum value of the count value is greater than or equal to an average value obtained from a total value of the count value, a count value at the second position at which the count value becomes a minimum on a periphery of a second reference point obtained from the reference point and the character height information is less than the average value, and a height of a character line on a lower side or on an upper side of the second position at the time of division at the second position is greater than a character height obtained from the character height information.

6. The character line division apparatus according to claim 2, wherein
the extraction unit extracts a character height mode from the character height information,
the first determination unit determines that the character is a normal character in a case where a height of each character indicated by the character information is the same as the mode,
the second determination unit determines that the character line of interest is a contact character line in a case where a character determined to be the normal character by the first determination unit does not exist in the character line of interest, and
the character line division unit performs character line division for the character line of interest by taking the first position as the character line division position.

7. The character line division apparatus according to claim 6, wherein
the second determination unit determines that the character line of interest is a contact character line in a case where a character determined to be the normal character by the first determination unit does not exist in the character line of interest and a height of the character line of interest is different from the mode.

8. The character line division apparatus according to claim 7, wherein
the first determination unit determines that the character is a line-contact character in a case where a height of each character indicated by the character information is different from the mode and the second determination unit determines that the character line of interest is a contact character line in a case where a character determined to be the normal character by the first determination unit does not exist in the character line of interest, a height of the character line of interest is different from the mode, and a character determined to be the line-contact character by the first determination unit exists in the character line of interest.

9. The character line division apparatus according to claim 8, wherein the first determination unit determines that the character is a line-contact character in a case where a height of each character indicated by the character information is different from the mode and reliability of each character indicated by the character information is less than a predetermined threshold value.

10. The character line division apparatus according to claim 8, wherein the first determination unit determines that the character is a line-contact character in a case where a height of each character indicated by the character information is different from the mode, reliability of each character indicated by the character information is less than a predetermined threshold value, and a height of each character indicated by the character information is the same as an integer (not less than two) multiple of the mode.

11. The character line division apparatus according to claim 6, wherein the first determination unit determines that the character is a character of vertical double size in a case where a height of each character indicated by the character information is different from the mode, reliability of each character indicated by the character information is less than a predetermined threshold value, a height of each character indicated by the character information is the same as an integer (not less than two) multiple of the mode, and an aspect ratio of the character is 2 and the character line division unit performs character line division by taking a lowermost position of the character of vertical double size as the character line division position in a case where a character determined to be the character of vertical double size by the first determination unit exists in the character line of interest.

12. The character line division apparatus according to claim 6, wherein the character line division unit performs character line division at the character line division position in a case where a position distant downward from a line upper-end position indicated by the character line information by the mode obtained based on the character height information is taken as the reference point.

13. The character line division apparatus according to claim 6, wherein the character line division unit performs character line division at the character line division position in a case where a position distant upward from a line lower-end position indicated by the character line information by the mode obtained based on the character height information is taken as the reference point.

14. The character line division apparatus according to claim 6, wherein the character line division unit has:

a first character line division unit configured to perform character line division at the character line division position in a case where a position distant downward from a line upper-end position indicated by the character line information by the mode obtained based on the character height information is taken as the reference point; and a second character line division unit configured to perform character line division at the character line division position in a case where a position distant upward from a line lower-end position indicated by the character line information by the mode obtained based on the character height information is taken as the reference point and the character line division apparatus further comprises a determination unit configured to determine whether to adopt character line division results by the first character line division unit or adopt character line division results by the second character line division unit based on the character line division position by the first character line division unit and the character line division position by the second character line division unit.

15. The character line division apparatus according to claim 14, wherein the determination unit determines to adopt one of character line division results by the first character line division unit and character line division results by the second character line division unit in a case where the character line division position by the first character line division unit and the character line division position by the second character line division unit are the same.

16. The character line division apparatus according to claim 14, wherein the determination unit performs OCR processing for character line division results obtained by the first character line division unit and the second character line division unit and determines character line division results to be adopted based on reliability of a character recognized by the OCR processing in a case where the character line division position by the first character line division unit and the character line division position by the second character line division unit are different.

17. The character line division apparatus according to claim 1, comprising:

a first removal unit configured to remove a ruled line from the binary image, wherein the acquisition unit acquires the character line information and the character information from the binary image from which the ruled line has been removed by the first removal unit.

18. The character line division apparatus according to claim 17, comprising:

a second removal unit configured to remove noise from the binary image, wherein the acquisition unit acquires the character line information and the character information from the binary image from which the noise has been removed by the second removal unit.

19. A character line division method comprising:

acquiring character line information indicating a size and a position of each character line within a binary image obtained by binarizing a scanned image obtained by optically reading a document, and character information indicating a size and a position of each character in a character line within the binary image;

extracting character height information indicating a character height from the character information;

determining whether a character comes into contact with another character in a character height direction based on the character height information;

determining whether a character line of interest among character lines in the document comes into contact with another character line in a height direction based on the character line information and determination results;

obtaining a count value obtained by counting a number of black pixels in a width direction in a character line of interest in the character line of interest determined to come into contact with another character line, and performing character line division for the character line of interest determined to come into contact with another character line on a periphery of a reference point obtained from a position of a character line indicated by the character line information and the character height information by taking a first position at which the count value becomes a minimum in a height direction of the character line of interest as a character line division position.

20. A non-transitory computer readable storage medium storing a program for causing a computer to perform as a character line division apparatus, wherein the character line division apparatus comprises:

an acquisition unit configured to acquire character line information indicating a size and a position of each character line within a binary image obtained by binarizing a scanned image obtained by optically reading a document, and character information indicating a size and a position of each character in a character line within the binary image;

an extraction unit configured to extract character height information indicating a character height from the character information;

a first determination unit configured to determine whether a character comes into contact with another character in a height direction based on the character height information;

a second determination unit configured to determine whether a character line of interest among character lines in the document comes into contact with another character line in a height direction based on the character line information and determination results by the first determination unit;

an obtaining unit configured to obtain a count value obtained by counting a number of black pixels in a width direction in a character line of interest in the character line of interest determined to come into contact with another character line by the second determination unit; and a character line division unit configured to perform character line division for the character line of interest determined to come into contact with another character line by the second determination unit on a periphery of a reference point obtained from a position of a character line indicated by the character line information and the character height information by taking a first position at which the count value becomes a minimum in a height direction of the character line of interest as a character line division position.

* * * * *